United States Patent
Wagner

(10) Patent No.: US 7,281,495 B2
(45) Date of Patent: Oct. 16, 2007

(54) COMBINATION PET COLLAR AND LEASH

(76) Inventor: Aaron T. Wagner, 622 Sixteenth St., Denver, CO (US) 80202

( * ) Notice: Subject to any disclaimer, the term of this patent is extended or adjusted under 35 U.S.C. 154(b) by 0 days.

(21) Appl. No.: 11/213,138

(22) Filed: Aug. 26, 2005

(65) Prior Publication Data
US 2006/0042562 A1 Mar. 2, 2006

Related U.S. Application Data

(60) Provisional application No. 60/606,220, filed on Aug. 31, 2004.

(51) Int. Cl.
A01K 27/00 (2006.01)
(52) U.S. Cl. .................... 119/793
(58) Field of Classification Search ........... 119/792, 119/793
See application file for complete search history.

(56) References Cited

U.S. PATENT DOCUMENTS

| 2,289,802 | A | | 7/1942 | Norton |
| 3,477,410 | A | | 11/1969 | Lettieri |
| 4,328,767 | A | | 5/1982 | Peterson |
| 4,584,967 | A | * | 4/1986 | Taplin ............... 119/793 |
| 5,005,527 | A | | 4/1991 | Hatfield |
| 5,099,799 | A | * | 3/1992 | Giacobbe ........... 119/793 |
| 5,497,733 | A | * | 3/1996 | Hull et al. ......... 119/793 |
| 5,711,255 | A | | 1/1998 | Rudolph |
| 5,718,189 | A | | 2/1998 | Blake |
| 5,816,198 | A | | 10/1998 | Peterson |
| 6,276,305 | B1 | | 8/2001 | Pages |
| 6,367,428 | B1 | * | 4/2002 | Forte ............... 119/863 |
| 6,397,783 | B1 | * | 6/2002 | Koch ............... 119/792 |
| 6,564,749 | B1 | * | 5/2003 | Dorsey ............. 119/771 |
| 6,581,547 | B1 | | 6/2003 | Austin |
| D492,454 | S | | 6/2004 | Saunders |

* cited by examiner

Primary Examiner—Rob Swiatek
(74) Attorney, Agent, or Firm—Hensley Kim & Holzer, LLC

(57) ABSTRACT

A combination pet collar and leash includes a leash that is attached to the collar and is fastened about the collar when not in use. When fastened about the collar, the leash conforms to the collar around the neck of a pet. When unfastened from the collar, the leash extends to a length to provide comfortable separation distance between a person holding the leash and the pet wearing the collar while allowing for appropriate control of the pet.

22 Claims, 9 Drawing Sheets

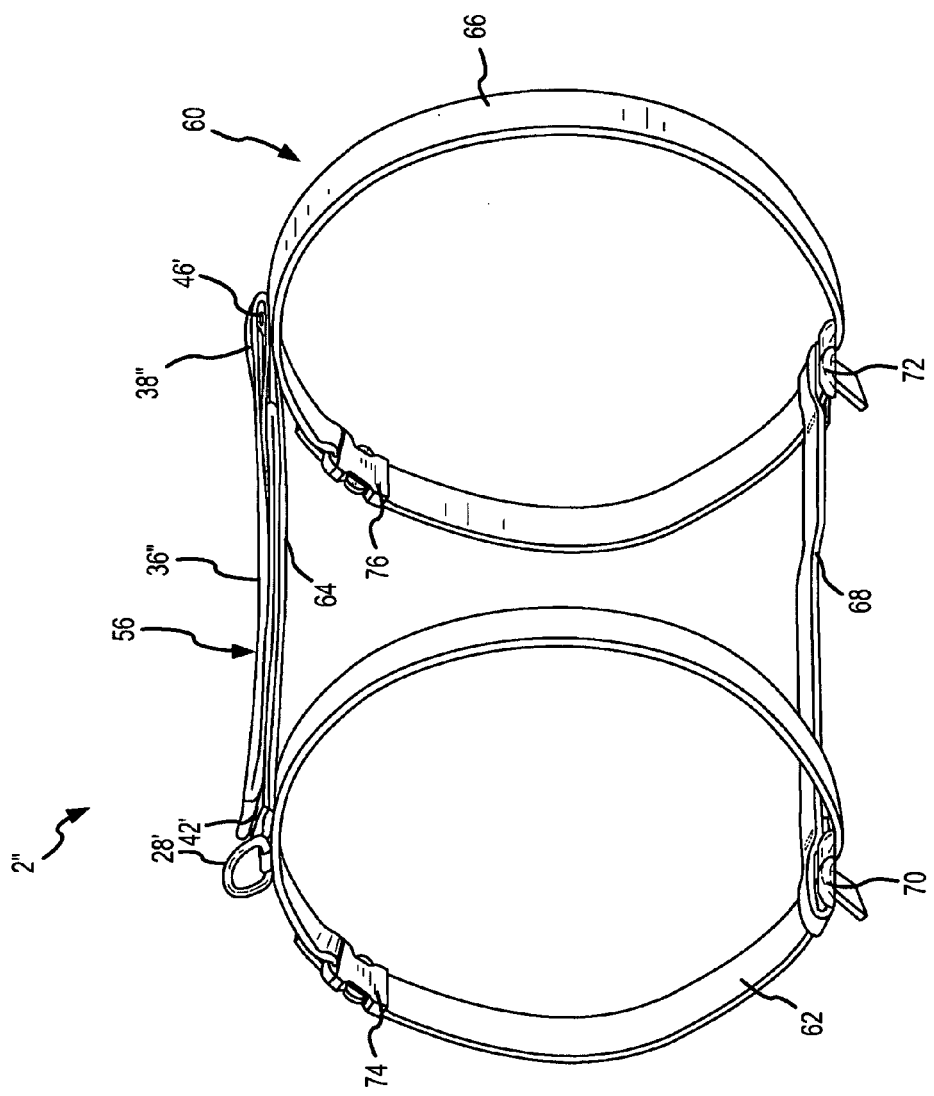

COMBINATION PET COLLAR AND LEASH

CROSS-REFERENCE TO RELATED APPLICATIONS

This application claims priority pursuant to 35 U.S.C. § 119(e) to U.S. provisional application No. 60/606,220 filed 31 Aug. 2004, which is hereby incorporated herein by reference in its entirety.

BACKGROUND OF THE INVENTION

1. Field of the Invention

This invention relates to pet collars and leashes.

2. Description of the Related Art

Several attempts have previously been made to combine a pet collar with a leash to provide convenience to the pet owner. One prior design provides for a single web that acts as a collar with a long tab extending beyond the buckle that functions as a leash. The outside surface of the collar portion is covered with a first type of Velcro® material while the outside surface of the remainder of the web is covered with a second type of Velcro® material. The inside of the web extending beyond the collar portion is also covered with the first type of Velcro® material, for at least a portion of the length of the web. In this manner, the portion of the web serving as the leash may be wrapped around the portion of the web serving as the collar and become fastened around the collar by the interface between the first and second types of Velcro® material. The leash portion is generally retained about the collar after two revolutions. While this design ensures that the leash closely mates to the collar when not in use, the continuous Velcro® attachment makes it difficult to easily remove the leash from about the collar. Further, the fact that the leash is an extension of the tab extending from the buckle may cause the collar to cinch tighter about the neck of a pet when the leash is pulled, thereby causing discomfort to the pet.

Another design provides for a bag hanging from the collar wherein the leash is rolled and contained within the bag and the leash clip protrudes from a small opening in the bag to attach to the collar. The bag has a zippered opening to allow the length of the leash and handle to be removed from the bag for use. One downside to this particular design is that when not in used, the rolled-up leash within the bag swings freely from the collar and bangs into the neck of the pet, which may be annoying to the pet.

A further prior design includes a compartment mounted on the pet collar that houses a retractable leash that winds about a spring-loaded disk. The disk rotates to allow the leash to play out of the compartment and the spring causes the disk to rotate in the opposite direction to retract the leash into the compartment when the tension on the leash from the user slackens. Similar to the previously described design, a detraction from this design is the fact that the compartment holding the retracted leash swings freely from the collar and bangs into the neck of the pet, which may be annoying to the pet.

The information included in this Background section of the specification, including any references cited herein and any description or discussion thereof, is included for technical reference purposes only and is not to be regarded subject matter by which the scope of the invention is to be bound.

SUMMARY OF THE INVENTION

The present invention provides a novel design for a pet collar with a built-in leash. The device allows a pet owner to walk their dog or other collared pet at any time, anywhere, without having to additionally carry a leash. In one form, a leash is an extension of the collar material. A handle loop may be attached to the end of the leash opposite the collar. The collar has a fastener adjacent the buckle on the opposite side of the buckle from the point of attachment of the leash. The leash has two fasteners, a first adjacent to the attachment point of the leash to the collar on the outside surface of the leash, and a second on the inside surface of the leash positioned approximately halfway along the combined length of the leash and handle. The handle further has a third leash fastener on the outside surface of the handle adjacent the tip end of the handle. When not in use the leash is wrapped about the collar to allow the second leash fastener to engage the collar fastener. The leash is then folded and wrapped about the collar in the opposite direction to allow the third leash fastener to engage the first leash fastener.

In another form with an intended application for small pets, the leash is composed of an elastic material attached to the pet collar adjacent the buckle. The elastic leash material allows the leash to extend a reasonable length while still allowing the leash to conveniently wrap around the neck of a small pet.

In yet another form of the invention, the leash may be attached to a harness that has both front band that generally extends from behind the neck of the pet and downward across the chest and a rear band that extends around the back and torso of the pet. The front band and rear band are attached to each other by top and bottom yokes spanning between the front and rear bands along the back and chest/abdomen of the pet. In this form the leash may either be fastened to the front band or the top yoke when not in use.

Other features, details, utilities, and advantages of the present invention will be apparent from the following more particular written description of various embodiments of the invention as further illustrated in the accompanying drawings and defined in the appended claims.

BRIEF DESCRIPTION OF THE DRAWINGS

FIG. 9 is an isometric view of a combination pet harness and leash according to yet another embodiment of the present invention with the leash in a folded and fastened position.

DETAILED DESCRIPTION OF THE INVENTION

Figure 1:
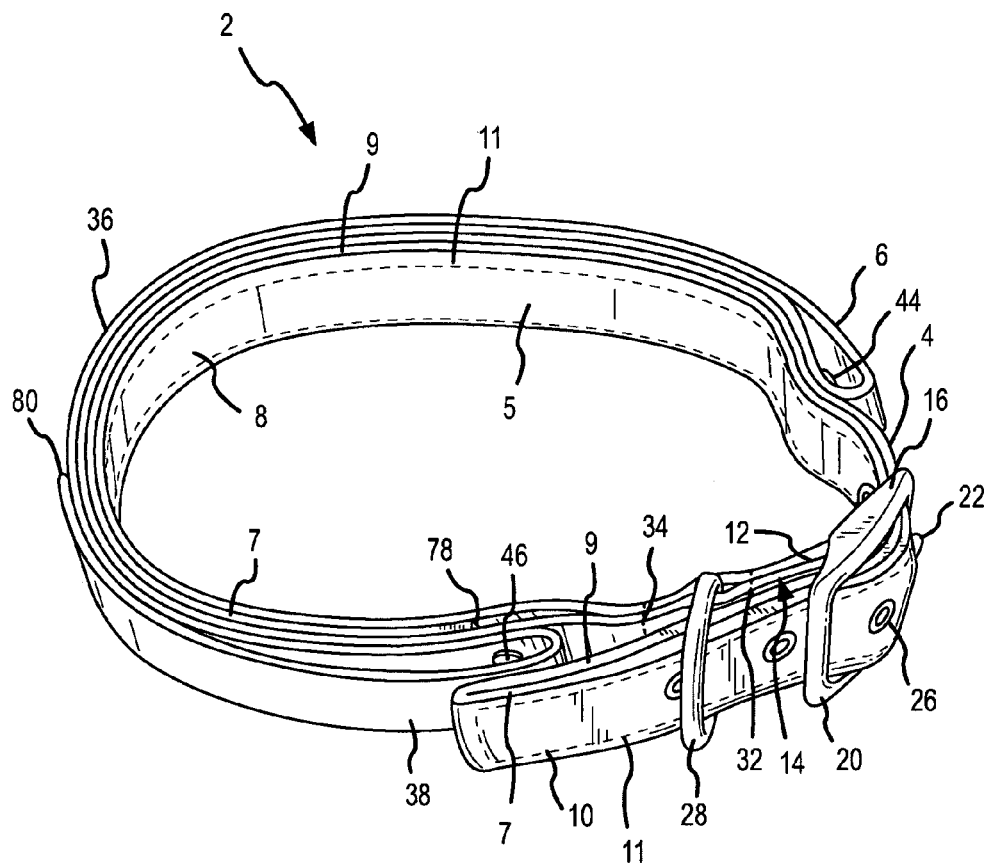
FIG. 1 is an isometric view from a first angle of a combination pet collar and leash according to one embodiment of the present invention with the leash in a folded and fastened position.
Figure 2:
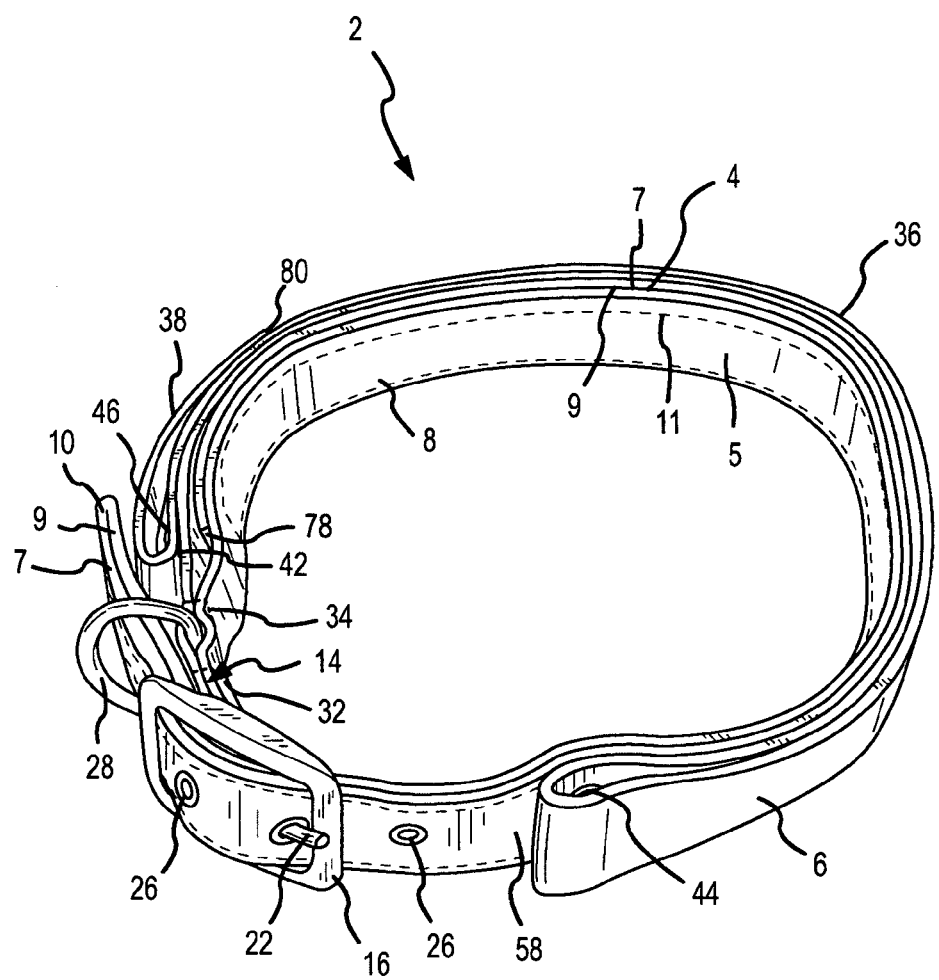
FIG. 2 is an isometric view from a second angle of the combination pet collar and leash of FIG. 1 with the leash in a folded and fastened position
Figure 3:
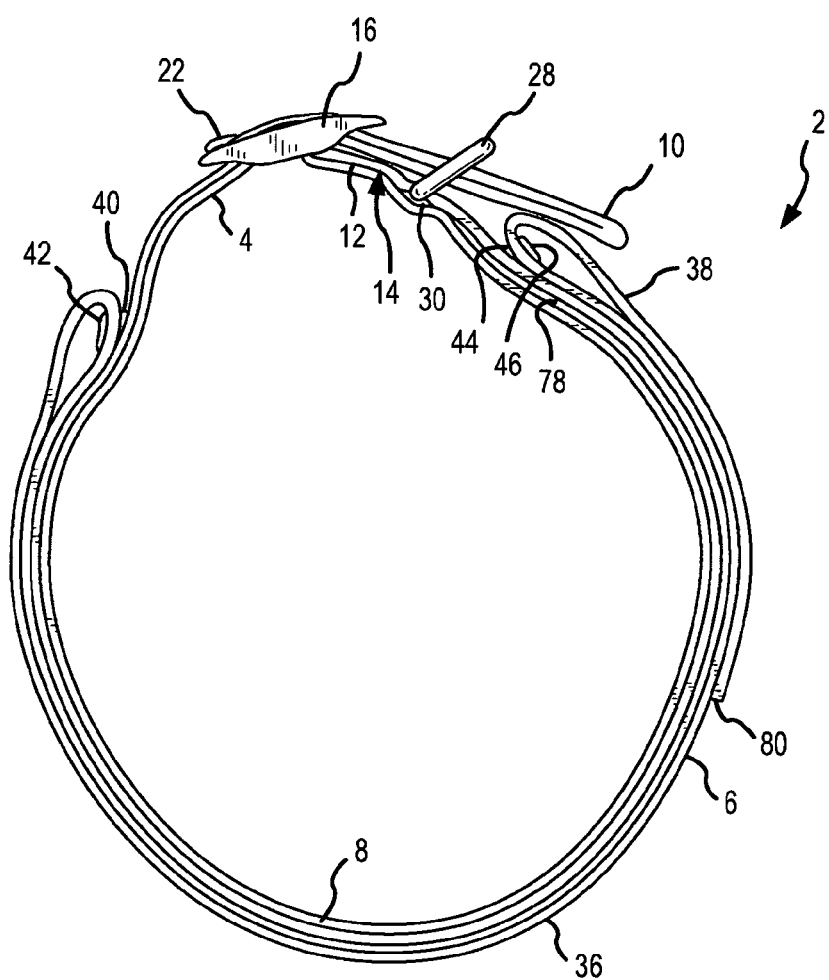
FIG. 3 is a top plan view of the combination pet collar and leash of FIG. 1 with the leash in a folded and fastened position.
Figure 4:
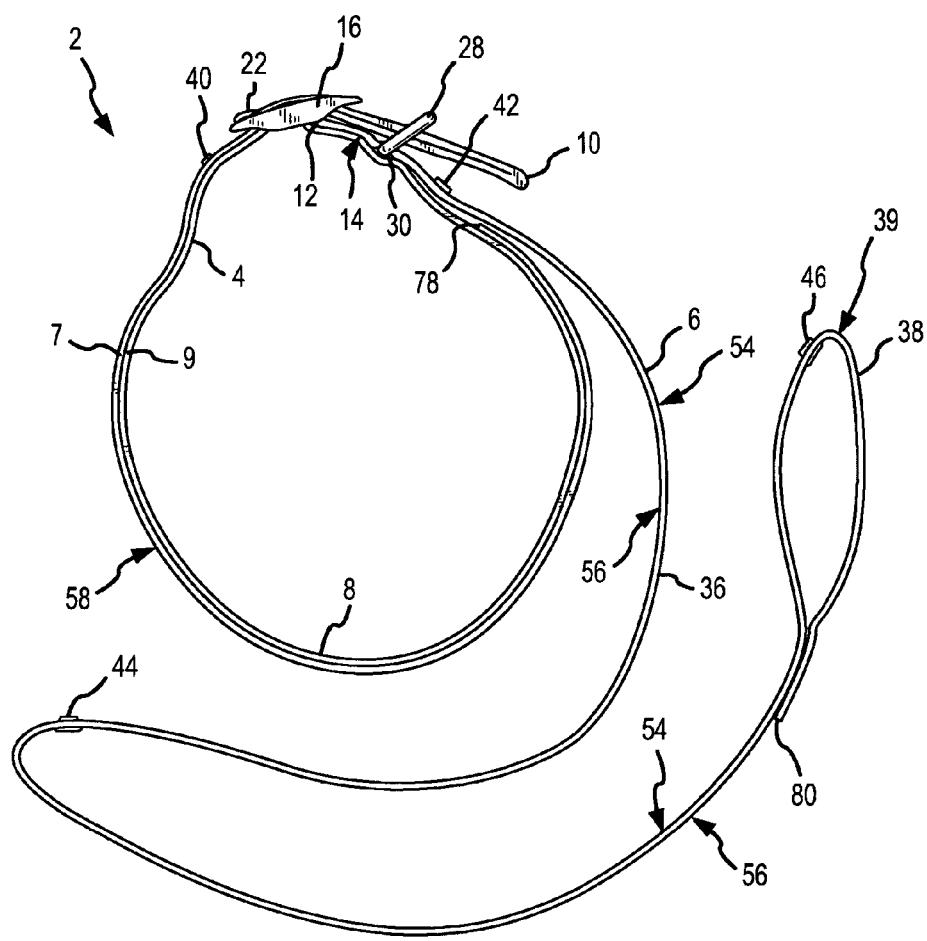
FIG. 4 is a top plan view of the combination pet collar and leash of FIG. 1 with the leash in an unfolded and unfastened position.

The present invention is a combination pet collar and leash. The leash is attached to the collar and is fastened about the collar when not in use. When fastened about the collar, the leash conforms to the collar around the neck of a pet. When unfastened from the collar, the leash extends to a length to provide comfortable separation distance between a person holding the leash and the pet wearing the collar while allowing for appropriate control of the pet. In one embodiment of the invention, the collar/leash 2 is generally composed of a collar portion 4 and a leash portion 6 as shown in FIGS. 1-4. The collar portion 4 is similar to a typical pet collar and includes an elongated section of collar webbing 8 with a buckle loop 12 formed at a first end, while the opposite second end is formed as a tab 10. The leash portion 6 includes a length of leash webbing 36 and a handle 38.

In the embodiment of FIGS. 1-4, the collar portion 4 and leash portion 6 may be formed of a single piece of webbing 5 that comprises both the collar webbing 8 and the leash webbing 36. The webbing 5 may be formed of, for example, a woven, rip-stop nylon web, a leather strap, a braided cord, or any other well-known material suitable for forming a pet collar or leash. The webbing may have a first end 78 and a second end 80. The collar webbing 8 begins at the first end 78 and extends a length to form a first half 7 of the collar portion, including a first half of the tab 10. The collar webbing 8 is folded back against itself to form a second half of the tab 10 and continues to extend a length to form a second half 9 of the collar portion 4. The two halves 7, 9 of the collar portion 8 are fastened together with stitching 11 along the perimeter of the webbing 5 in order to form a double-walled collar portion 8.

A section of the collar webbing 8, identified as retention section 14, extends beyond the first end 78 of the webbing 5 and is folded against an adjacent section of the collar webbing 8 to form a buckle loop 12. A buckle 16 is retained within the buckle loop 12. The buckle 16 may be a standard pet collar buckle with a buckle frame 20 spanned by a buckle hinge 18 and a prong hinge 24 (see FIG. 5). Alternatively, any appropriate fastening device for engagement of the webbing 5 could be used in place of the buckle 16, for example, a clip, a snap hook, a slide release buckle, a snap fastener, a cam buckle, a slide buckle, a D-ring or O-ring set, or a tension lock. The retention section 14 may be fastened to the collar webbing 8 at a first location with buckle retention stitching 32 and thus enclose the buckle hinge 18 within the buckle loop 12. A buckle prong 22 is attached to and at least partially rotates about the prong hinge 24. The buckle hinge 18 is positioned within the buckle loop 12 whereby two opposing sidewalls of the buckle frame 20 are positioned across the width of the collar webbing 8. A series of prong holes 26 are formed within the collar tab 10 to retain the buckle prong 22 at several optional positions along the collar webbing 8, allowing for an adjustable fit of the collar portion 4 about a pet's neck.

An optional leash ring 28 may further attached to the collar portion 8. The retention section 14 may further be fastened to the collar webbing 8 at a second location with ring retention stitching 34. The leash ring 28 is thereby retained within a leash ring slot 30 bounded by the buckle retention stitching 32, the ring retention stitching 34, and the retention section 14 of the collar webbing 8. The leash ring 28 may be used for attachment of a normal, separate leash by a clip or for otherwise tying or attaching a lead or cable to the pet. The provision of a leash ring 28 may be desirable in a circumstance in which a longer leash is desired or there is a need to tie the pet in a stationary location.

The leash portion 6 of the collar/leash 2 is formed of a leash webbing 36, which may merely be an extension of the length of webbing 5 forming the collar webbing 8. In an alternative embodiment, the leash webbing may be a separate length of webbing and affixed at a first end to the collar webbing 8 generally adjacent to the buckle loop 12. In this alternate embodiment, the leash webbing 36 would, similarly to the collar webbing 8, be formed of, for example, a woven, rip-stop nylon web, a leather strap, a braided cord, or any other well-known material suitable for forming a pet leash. At the opposite end of the leash webbing 36, a handle 38 may be provided in the form of a loop of the leash webbing 36 by folding a section of the leash webbing 36 at the second end 80 of the webbing 5 against an adjacent section of the leash webbing 36 to form a loop for the handle 38. The length of the leash webbing 36 and the handle 38 together is slightly less than twice the smallest circumference of the collar portion 4 when fitted about the neck of a pet with the buckle prong 22 inserted in the prong hole 26 furthest from the tip of the collar tab 10.

The collar portion 4 has a collar fastener 40 positioned on the outer surface 58 of the collar webbing 8 adjacent the prong hole 26 furthest from the tip of the collar tab 10. The collar fastener is thus adjacent the buckle 16 on the side of the buckle 16 opposite the collar tab 10. The leash portion 6 has two fasteners. A first leash fastener 42 is positioned on the leash webbing 36 adjacent to retention section 14 of the collar portion 4 on the outside surface 54 of the leash webbing 36. A second leash fastener 44 is positioned on the inside surface 56 of the leash webbing 36 at a point approximately halfway along the combined length of the leash webbing 36 and handle 38. The handle 38 further has a third leash fastener 46 on the outside surface 54 of the handle 38 adjacent the tip end 39 of the handle 38. The fasteners can be any type of operable fastening mechanism or device, for example, opposing snaps, opposing hook and loop fastener (e.g., Velcro®) materials, buttons and button holes, rings and clips, and opposing attractive magnets.

When not in use the leash portion 6 may be wrapped about a section of collar webbing 8 of the collar portion 4 extending from each side of the buckle 16 and around the neck of the pet. Initially, the second leash fastener 44 is positioned opposite the collar fastener 40 and is engaged with the collar fastener 40 to hold a first half of the leash portion 6 firmly against the collar portion 4. The leash portion 6 is then folded and wrapped about the collar portion 4 against the first half of the leash portion 6 in the opposite direction to align the third leash fastener 46 opposite the first leash fastener 42. The third leash fastener 46 is then engaged with the first leash fastener 42 to hold a second half of the leash portion 6 firmly against the first half of the leash portion 6 and thus firmly against the collar portion 4. Additional fasteners and sections of the leash portion 6 may be folded against and fastened to the collar portion 4 in order to accommodate a longer leash or to fasten the leash portion 6 about the neck of a small pet with a small neck circumference.

Figure 5:
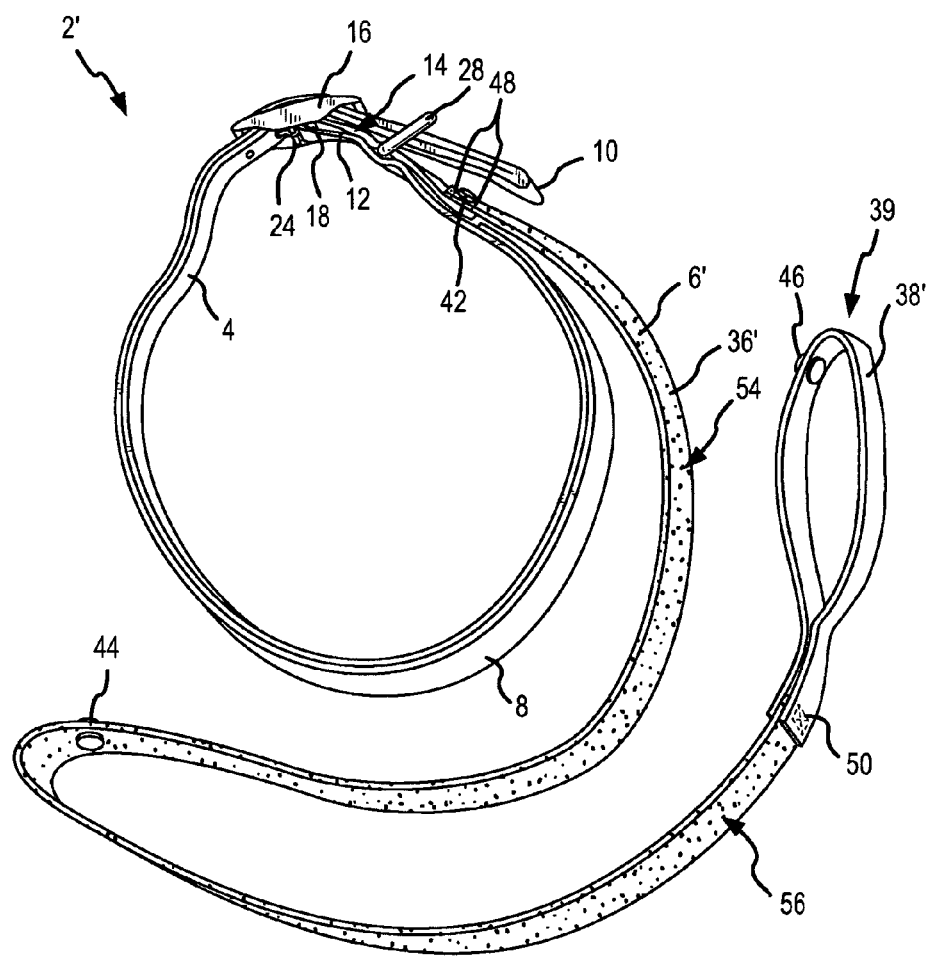
FIG. 5 is a top isometric view of a combination pet collar and leash according to another embodiment of the present invention with the leash in a unfolded and unfastened position.

In an alternate embodiment shown in FIG. 5, the leash webbing 36' may be an elastic material and may be fixed at a first end to the collar webbing 8 generally adjacent to the buckle loop 12. The leash webbing 36' at a first end of the leash portion 6' may be attached to the collar webbing 8 with leash attachment stitching 48. In an alternate embodiment, the leash portion 6' may be attached to the collar webbing 8 by the ring retention stitching 34. Alternatively, the elastic leash webbing 36' may be integrally woven with the end of the collar webbing 8 extending from the retention section 14. The handle 38' may be a section of webbing or other non-elastic material attached to the opposite end of the leash webbing 36'. The webbing of the handle 38' may be folded into a loop such that each end of the webbing is adjacent to the other and then both ends of the webbing section may be attached to the leash webbing 36', for example, by sewing with handle attachment stitching 50. This provides a sturdy handle 38' for grasping by the pet owner rather than an elastic handle that may not be as comfortable to grip because of the continual expansion and contraction of the elastic.

The dynamic length of the leash webbing 36' allows a single leash portion 6' to be used with a variety of different sized pets and owners, allowing for a comfortable distance between pet and owner regardless of the relative height of either. Alternatively, the elastic leash webbing 36' may principally be used in conjunction with small circumference collars for small pets. For example, a small pet will have a smaller circumference neck than a larger pet and thus only a short length of leash could be folded and fastened about the neck of the pet. Such a short length for a leash portion 6 may be impracticable for use by the pet owner. Using an elastic material for the leash webbing 36' provides for a longer effective leash portion 6' than an inelastic leash webbing when tension is placed on the leash webbing 36' by the pet pulling against the lease portion 6' while held by the pet owner. The dynamic length of the leash webbing 36' also allows some flexibility for allowing the pet to move about or explore while the pet owner is stationary. The leash webbing 36' may be slightly shorter in length than leash webbing of a generally inelastic material. In this manner, the leash webbing 36' may be placed under slight tension in a slightly expanded state when folded about and attached to the collar portion 4, thus keeping the leash portion 6' snugly against the collar portion 4 and minimizing the opportunity for the leash portion 6' to get caught on a snag.

Figure 6:
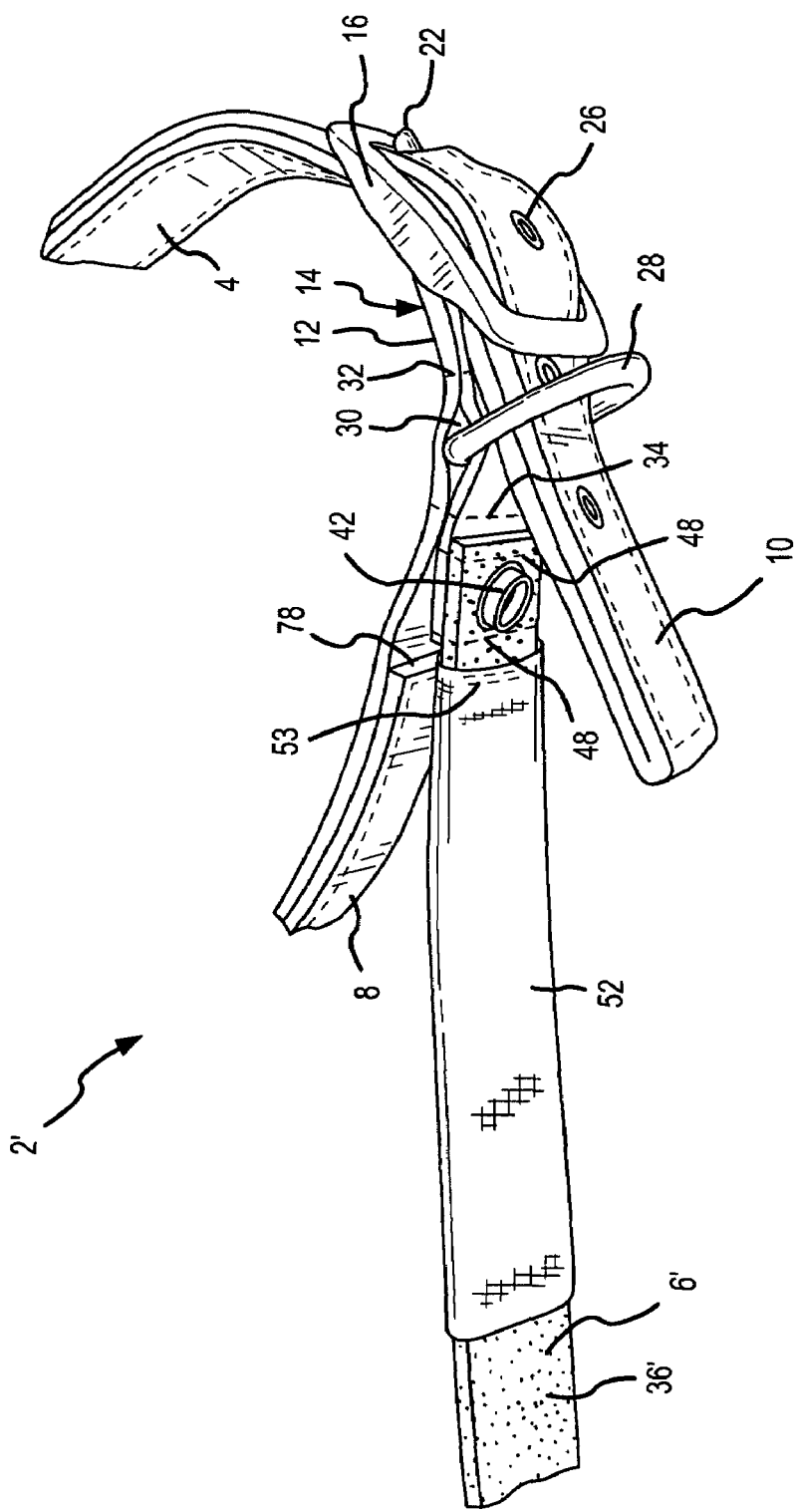
FIG. 6 is a detailed isometric view of a portion of a combination pet collar and leash according to a further embodiment of the present invention with the leash in a unfolded and unfastened position.

A further option to this embodiment, as shown in FIG. 6, includes a leash guard 52 that may be placed around the leash webbing 36' and attached to the leash webbing adjacent to the first leash fastener 42, for example, with leash guard stitching 53. This may be desired because the elastic material of the leash webbing 36' may not be as durable as other materials. In this manner, pets with a propensity to grasp or gnaw a leash section adjacent to the collar portion 4' will be deterred from damaging the elastic material of the leash webbing 36'. In an exemplary embodiment, the leash guard 52 may be a flat tube of rip-stop nylon material slipped over the leash webbing 36' and attached to the leash webbing 36' adjacent the first leash fastener 42. The leash guard 52 may be made of any other suitable material, e.g., leather, plastic or other polymer, or metal mesh, that would resist damage to the leash from chewing by a pet. By attaching only the end of the leash guard 52 closest to the collar portion 4, the leash guard 52 remains in a position closest to pet where the pet is most likely to gnaw the leash portion 6', while allowing the elastic material of the leash webbing 36' to slide within the flat tube of the leash guard 52, expanding and contracting as tension is placed upon the leash portion 6'.

Figure 7:
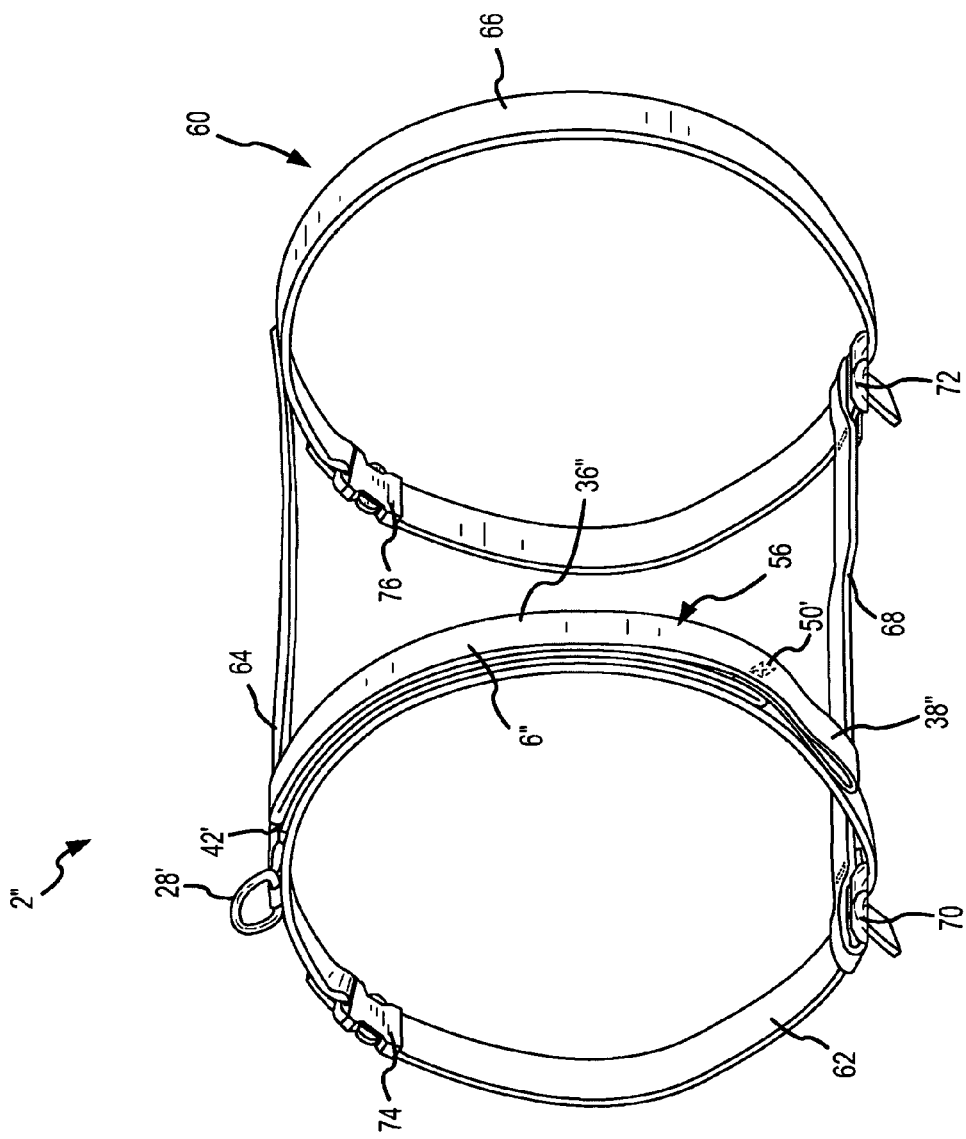
FIG. 7 is an isometric view of a combination pet harness and leash according to an alternative embodiment of the present invention with the leash in a folded and fastened position.
Figure 8:
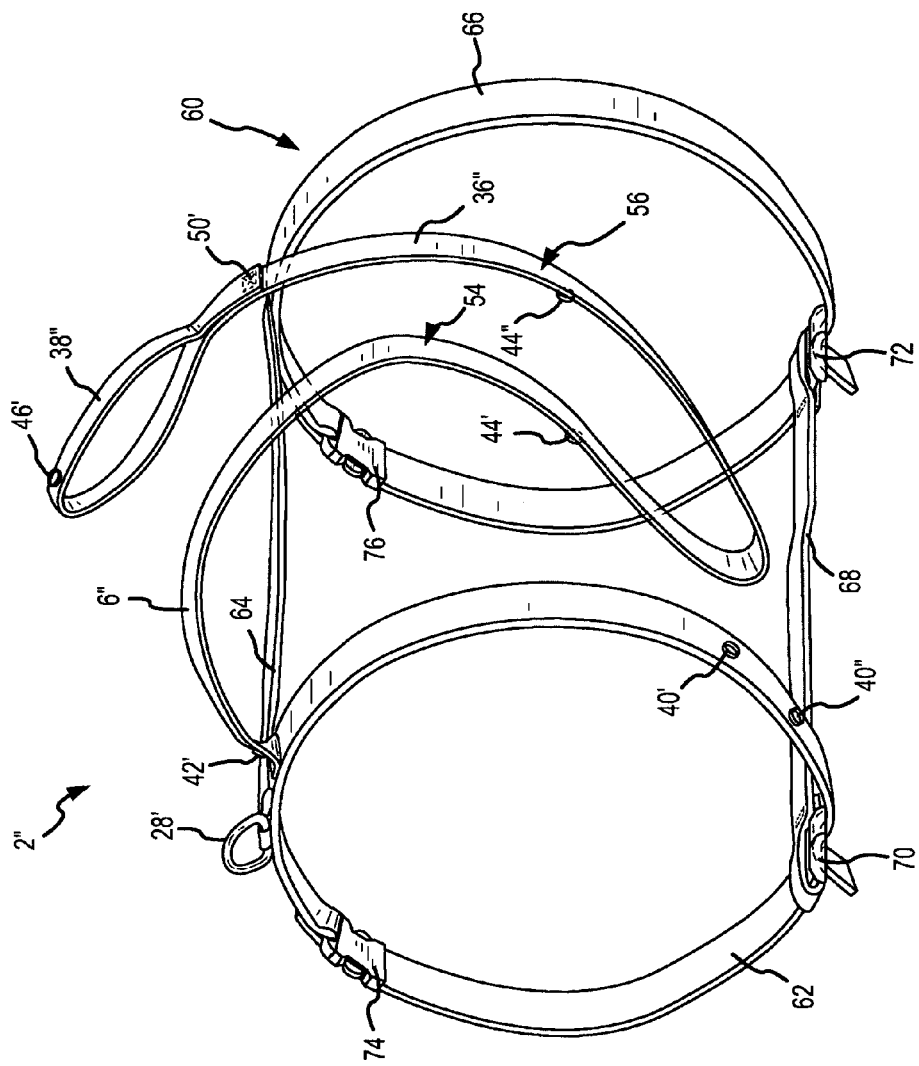
FIG. 8 is an isometric view of the combination pet harness and leash of FIG. 7 with the leash in an unfolded and unfastened position.

An alternate embodiment of the invention is depicted in FIGS. 7-9. In this embodiment, a leash portion 6" is combined with a pet harness 60. An exemplary pet harness 60 may have a front harness band 62 and a rear harness band 66 connected to each other at the top by an upper harness yoke 64 and at the bottom by a lower harness yoke 68. The pet harness 60 may be formed of, for example, a woven, rip-stop nylon web, a leather strap, a braided cord, elastic material, or any other well-known suitable material for forming a harness. The upper harness yoke 64 is generally positioned along the upper spine of the pet and may retain a leash ring 28' for attachment of a traditional leash or other restraint to the harness 60. The front harness band 62 is typically positioned about the neck of a pet while the rear harness band 66 is positioned about the chest of the pet. The front harness band 62 may have a first adjustment buckle 70 to increase or decrease the size of the front harness band 62 to fit varying neck sizes of different types and sizes of pets. The rear harness band 66 may likewise have a second adjustment buckle 72 in order to adjust the size of the rear harness band 66 about the chest of the pet. Each of the front and rear harness bands 62, 66 may further be provided with first and second release clips 74, 76, respectively, adjacent the upper harness yoke 64 for ease in quickly placing and removing the harness on and from the pet. Other types and designs of harnesses may likewise be used.

The leash portion 6" may again be formed of a leash webbing 36" and may be fixed at a first end to the upper harness yoke 64 generally adjacent to the leash ring 28'. The leash webbing 36" may be formed of, for example, a woven, rip-stop nylon web, a leather strap, a braided cord, elastic material, or any other well-known suitable material for forming a pet leash. In one embodiment, the leash webbing 36" at a first end of the leash portion 6" may be attached to the top harness yoke 64 with leash attachment stitching. At the opposite end of the leash webbing 36', a handle 38' may be provided in the form of a loop of the leash webbing 36" by folding a section of a second end of the leash webbing 36" against an adjacent section of the leash webbing 36" to form a loop for the handle 38".

In this embodiment, the harness 60 may have two fasteners. The harness 60 has a first harness fastener 40' positioned on the on the outer surface of the front harness band 62 adjacent the bottom harness yoke 68. The harness 60 also has a second harness fastener 40", which is also positioned on the on the outer surface of the front harness band 62 adjacent the bottom harness yoke 68. The second harness fastener 40" is positioned between the first harness fastener 40' and the bottom harness yoke 68. In this embodiment, the leash portion 6" may have four fasteners. A first leash fastener 42' is positioned adjacent to the leash ring 28' on the outside surface 54 of the leash webbing 36". A second leash fastener 44' is positioned on the inside surface 56 of the leash webbing 36" at a point approximately one-third of the way along the combined length of the leash webbing 36" and handle 38". A third leash fastener 44" is positioned on the outside surface 54 of the leash webbing 36" at a point approximately two-thirds of the way along the combined length of the leash webbing 36" and handle 38". The handle 38" further has a fourth leash fastener 46' on the inside surface 56 of the handle 38" adjacent the tip end of the handle 38". The fasteners can be any type of operable fastening mechanism or device, for example, opposing snaps, opposing hook and loop fastener (e.g., Velcro®) materials, buttons and button holes, rings and clips, and opposing attractive magnets.

When not in use the leash portion 6" may be fastened against a section of the front harness band 62 about the neck of the pet. Initially, the second leash fastener 44' is positioned opposite the first harness fastener 40' and is engaged with the first harness fastener 40' to hold a first third of the leash portion 6''' firmly against the front harness band 62. The leash portion 6" is then folded and wrapped about the front harness band 62 against the first third of the leash portion 6" in the opposite direction to align the second leash fastener 44" opposite the first leash fastener 42'. The second leash fastener 44" is then engaged with the first leash fastener 42' to hold a second third of the leash portion 6" firmly against the first third of the leash portion 6" and thus firmly against the front harness band 62. Finally, the leash portion 6" is again folded and wrapped about the front harness band 62 against the second third of the leash portion 6" in the opposite direction to align the fourth leash fastener 46' opposite the second harness fastener 40". The fourth leash fastener 46' is then engaged with the second harness fastener 40" to hold the final third of the leash portion 6" firmly against the second third of the leash portion 6" and thus firmly against the front harness band 62. It should be noted that when the leash portion 6" is describes as being folded in thirds, such a measurement is not exact as the second third may be slightly longer than the first third and the final third may be slightly longer than the second third as indicated in the figures.

Alternately, as shown in FIG. 9, the leash portion 6" may be fastened against the top harness yoke 64 along the back of the pet. In this embodiment, the a first harness fastener 40' is positioned on the on the outer surface of the top harness yoke 64 adjacent the rear harness band 66. The harness 60 also has a second harness fastener 40", which is also positioned on the on the outer surface of the top harness yoke 64 adjacent the rear harness band 66. The second harness fastener 40" is positioned between the first harness fastener 40' and the rear harness band 66.

Similar to the previous embodiment, in order to fold and fasten leash portion 6" to the harness 60, the second leash fastener 44' is positioned opposite the first harness fastener 40' and is engaged with the first harness fastener 40' to hold a first third of the leash portion 6''' firmly against the top harness yoke 64. The leash portion 6" is then folded against the first third of the leash portion 6" in the opposite direction to align the second leash fastener 44" opposite the first leash fastener 42'. The second leash fastener 44" is then engaged with the first leash fastener 42' to hold a second third of the leash portion 6" firmly against the first third of the leash portion 6" and thus firmly atop the top harness yoke 64. Finally, the leash portion 6" is again folded against the second third of the leash portion 6" in the opposite direction to align the fourth leash fastener 46' opposite the second harness fastener 40". The fourth leash fastener 46' is then engaged with the second harness fastener 40" to hold the final third of the leash portion 6" firmly against the second third of the leash portion 6" and thus firmly atop the top harness yoke 64. It should be noted that when the leash portion 6" is describes as being folded in thirds, such a measurement is not exact as the second third may be slightly longer than the first third and the final third may be slightly longer than the second third as indicated in the figures.

Further, it should be apparent that the leash portion 6" may be folded against various sections or portions of the harness 60.

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. All directional references (e.g., proximal, distal, upper, lower, upward, downward, left, right, lateral, front, back, top, bottom, above, below, vertical, horizontal, clockwise, and counter-clockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A combination pet collar and leash comprising
   a collar portion;
   a first fastener positioned on an outer surface of the collar portion;
   a leash portion attached at a first end to the collar portion and extending therefrom;
   a second fastener positioned on an outside surface of the leash portion adjacent the first end of the leash portion;
   a third fastener positioned on an inside surface of the leash portion;
   a fourth fastener positioned on a second end of the leash portion;
   wherein when the leash portion is placed in a storage position about the collar portion,
   the third fastener engages the first fastener;
   the leash portion folds back against itself; and
   the second fastener engages the fourth fastener.

2. The combination pet collar and leash of claim 1, wherein the collar portion and the leash portion are of unitary construction.

3. The combination pet collar and leash of claim 2, wherein the collar portion and the leash portion are composed of a single elongate web member.

4. The combination pet collar and leash of claim 1, wherein the leash portion comprises an elastic material.

5. The combination pet collar and leash of claim 4 further comprising a leash guard positioned about the leash portion adjacent the collar portion.

6. The combination pet collar and leash of claim 5, wherein the leash guard is affixed to the leash portion at only one end of the leash guard that is most closely adjacent the collar portion.

7. The combination pet collar and leash of claim 4, wherein the leash portion further comprises a handle attached to the elastic material at a second end of the leash portion.

8. The combination pet collar and leash of claim 1, wherein the leash portion further comprises a handle.

9. The combination pet collar and leash of claim 1 further comprising a leash ring attached to the collar portion.

10. The combination pet collar and leash of claim 1, wherein each of the first, second, third, and fourth fasteners is a snap fastener.

11. The combination pet collar and leash of claim 1, wherein each of the first, second, third, and fourth fasteners is a hook and loop fastener.

12. The combination pet collar and leash of claim 1, wherein the collar portion is in the form of a harness assembly comprising
a front harness band;
a rear harness band;
a top harness yoke connecting the front harness band and the rear harness band; and
a bottom harness yoke connecting the front harness band and the rear harness band.

13. The combination pet collar and leash of claim 12, wherein the first fastener is positioned on the front harness band.

14. The combination pet collar and leash of claim 12, wherein the first fastener is positioned on the top harness yoke.

15. A combination pet collar and leash comprising
a continuous length of webbing forming a collar portion and a leash portion;
a fastening device nonreleasably affixed to the collar portion at a first location and releasably attached to the collar portion at a second location adjacent an end of the length of webbing; wherein the first location is spaced apart from the second location substantially the circumference of a pet's neck; and wherein
the leash portion extends from the collar portion from a third location substantially adjacent the first location and between the first location and the second location along the length of webbing and without overlapping the end while in use.

16. The combination pet collar and leash of claim 15, wherein the collar portion further comprises
a first section of the webbing beginning at a first end of the webbing;
a second section of the webbing, contiguous with and of substantially the same length as the first section, that folds against the first section and is secured to the first section;
a collar tab formed by the first section and the second section adjacent the fold at the second location, wherein the collar tab releasably attaches to the fastening device;
a third section of the webbing contiguous with and extending from the second section the second section, wherein the third section is affixed to the fastening device at the first location; and
a fourth section of webbing extending from the third section to form the leash portion; and
wherein the combination pet collar and leash further comprises
a first fastener positioned on an outer surface of the first section of the webbing;
a second fastener positioned on an outside surface of the leash portion adjacent the third location;
a third fastener positioned on an inside surface of the leash portion; and
a fourth fastener positioned on a second end of the leash portion;
wherein when the leash portion is placed in a storage position about the collar portion,
the third fastener engages the first fastener;
the leash portion folds back against itself; and
the second fastener engages the fourth fastener.

17. The combination pet collar and leash of claim 16, wherein the fastening device is a buckle.

18. The combination pet collar and leash of claim 17, wherein the buckle further comprises a hinge and the third section of the webbing loops around the hinge of the buckle.

19. The combination pet collar and leash of claim 15, further comprising a leash ring attached to the collar portion.

20. A method of making a combined pet collar and leash from a single length of webbing, the method comprising
selecting a first section of the webbing beginning at a first end of the webbing;
folding a second section of the webbing, contiguous with and of substantially the same length as the first section, against the first section;
securing to the first section of the webbing to the second section of the webbing;
attaching a third section of the webbing, contiguous with and extending from the second section the second section, to a fastening device;
affixing a first fastener to an outer surface of the first section of the webbing;
affixing a second fastener to an outside surface a fourth section of the webbing, which extends from the third section of the webbing to form a leash portion, at a position adjacent the third section of the webbing;
affixing a third fastener to an inside surface of the fourth section of the webbing; and
affixing a fourth fastener to the outside surface of the fourth section of the webbing at a position substantially adjacent a second end of the webbing; wherein
the third fastener is adapted to engage the first fastener; and
the second fastener is adapted to engage the fourth fastener.

21. The method of claim 20 further comprising forming a handle by
folding a first portion of the fourth section of the webbing at the second end of the webbing against an adjacent second portion of the second end of the webbing; and
securing the first portion of the fourth section of the webbing to the second portion of the fourth section of the webbing to form a loop in the fourth section of the webbing.

22. The method of claim 20 further comprising attaching a leash ring to the third section of the webbing.

* * * * *